March 31, 1931. M. C. HUFFMAN 1,798,675
AUTOMATIC LUBRICATOR
Filed March 29, 1928
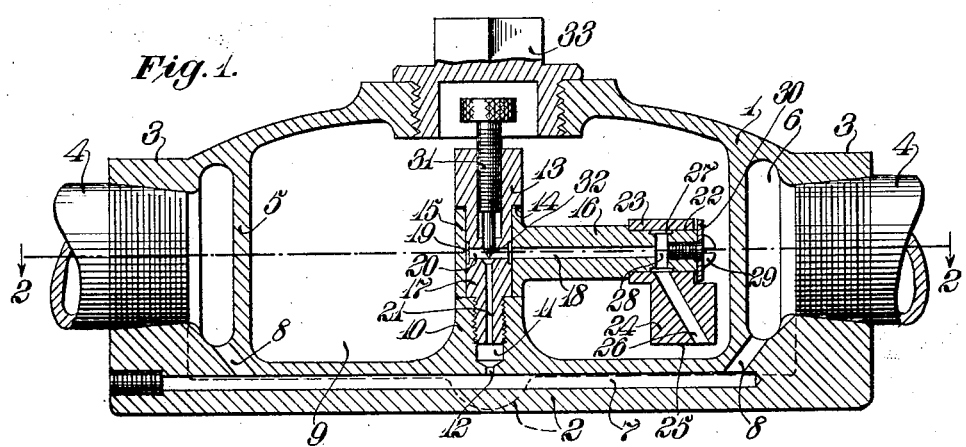
Fig. 1.
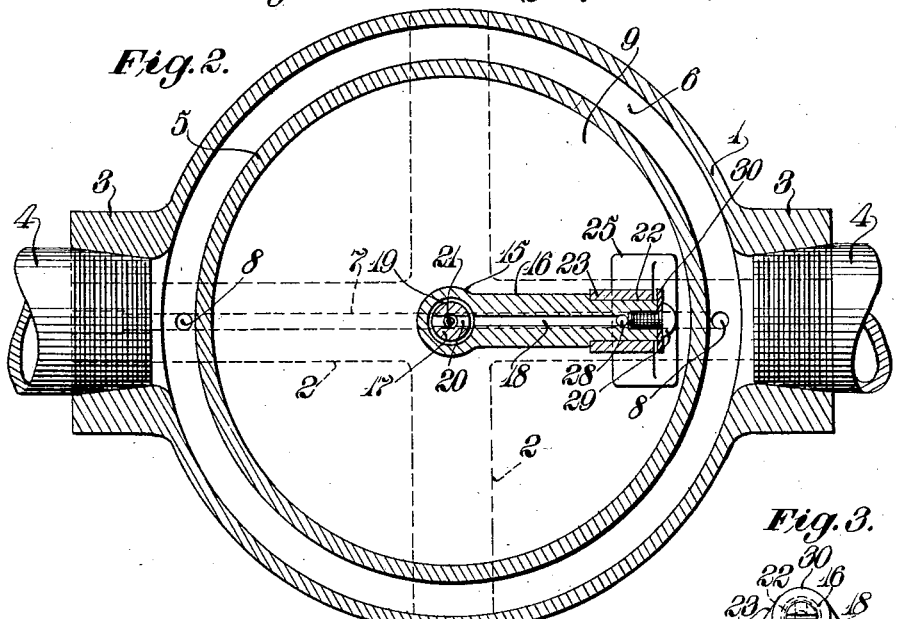
Fig. 2.
Fig. 3.
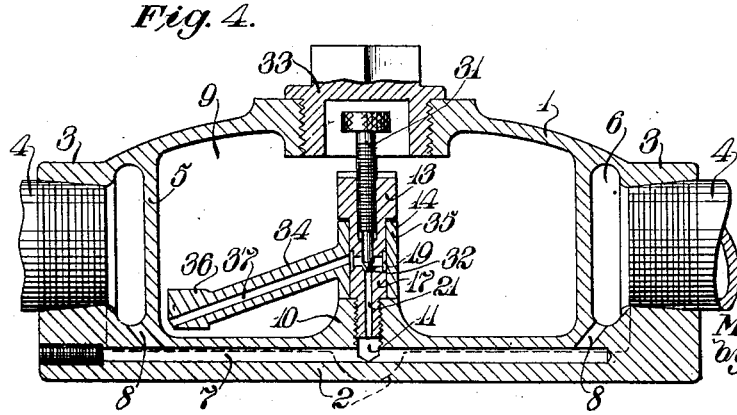
Fig. 4.
Inventor:
Mervin C. Huffman
by Louis A. Maxim
Atty.

Patented Mar. 31, 1931

1,798,675

UNITED STATES PATENT OFFICE

MERVIN C. HUFFMAN, OF CLAREMONT, NEW HAMPSHIRE, ASSIGNOR TO SULLIVAN MACHINERY COMPANY, A CORPORATION OF MASSACHUSETTS

AUTOMATIC LUBRICATOR

Application filed March 29, 1928. Serial No. 265,771.

My invention relates to automatic lubricators of a type particularly adapted for use in fluid pressure supply lines for rock drilling tools and generally known in the trade as "Lineoilers".

An object of my invention is to provide an improved automatic lubricator of the type specified which shall be simple in construction and all of the parts of which are easily accessible. It is a further object to provide an improved lubricator adapted to be installed in the pressure fluid supply line leading to a drilling tool on the line, and operating in response to fluctuations in pressure in the supply line. Another object is to provide an improved arrangement embodying a pivotally mounted device for withdrawing the total amount of lubricant in a reservoir in any position of the same. A more specific object is to provide an improved automatic lubricator having improved means for pivotally mounting a pair of relatively movable elements in the reservoir thereof. Other objects and advantages of the invention will hereinafter more fully appear.

In the accompanying drawings there are shown for purposes of illustration two forms which the invention may assume in practice.

In these drawings:

Fig. 1 is a central vertical section through one form of my improved lubricator.

Fig. 2 is a horizontal section through the lubricator on line 2—2 of Fig. 1.

Fig. 3 is an end view of the movable elements in the lubricator.

Fig. 4 is a central vertical section through a modified form of my invention.

In the preferred embodiment as illustrated in Figs. 1 to 3 the lubricator comprises a body portion 1 of generally flat cylindrical form provided with a plurality of ribs 2 extending transversely of each other on the bottom of said body portion upon which the lubricator is adapted to rest when in normal position. The body member has formed thereon a pair of internally threaded bosses 3 at opposite sides thereof for connection to a pressure fluid line 4. A circularly extending web 5 is spaced from the outer wall of the lubricator so as to provide an annular passageway 6 through which the greater part of the pressure fluid flowing through the line 4 is conducted. A small passage 7 communicates through angularly extending passages 8 at its opposite ends with the annular passageway 6 and thus serves to conduct a limited amount of the actuating fluid. The body portion is generally hollow to provide a lubricant reservoir 9 inside the web 5 and projecting upwardly into the reservoir is an integral boss 10. This boss has a bore 11 communicating by a port 12 with the passage 7 and internally threaded to receive the threaded lower end of a combined bearing and valve member 13. Between a shoulder 14 on this member and the top of the boss 10 is mounted the hub portion 15 of a horizontal fluid conducting member 16 so as to swing about the reduced portion 17 as a bearing. The member 16 has a longitudinal bore 18 which communicates with bore 11 by means of an annular groove 19 and passages 20 and 21 in the bearing member 13. The end of the member 16 is reduced to provide a bearing portion 22 upon which is mounted a hub 23 of a swinging member 24 which, as shown in Fig. 3, is provided with a weighted lower end 25 so as to insure that it will always assume the proper position even if the lubricator be inverted. This swinging member has a passage 26 which communicates with the bore 18 by way of an annular groove 27 and transverse passages 28. A suitable retaining device such as a screw 29 and washer 30 is provided for retaining the swinging member in position. The flow of lubricant is adapted to be controlled by means of a manually adjustable valve member 31 having a conical portion 32 which cooperates with a conical seat in the passage 21. A removable filling plug 33 is threaded into the top wall of the reservoir and is preferably located so that when removed the valve 31 will be accessible for purposes of adjustment. In assembling this device the plug 33 is removed and swinging members 16 and 24 are attached to each other and placed in the reservoir through the filling opening. The combined bearing and valve member 13 is next inserted through the hub 15 and screwed home. The valve 31 may now be threaded to position and adjusted according to the amount of lubricant desired. The construction is such that the parts are readily assembled without making the main body portion of the device in separable sections.

In operation a suitable valve in the air line leading to the lubricator will be shut off when it is desired to fill the reservoir with lubricant and after filling the same, plug 33 is inserted and the valve may be opened. This places the lubricator under pressure and pressure fluid flows through passages 8, bore 11, passages 21, 18, and 26 until the pressure inside the reservoir has reached substantially line pressure. Now if the operator of a tool to which pressure fluid is being supplied opens the throttle valve of this machine there will be a flow of pressure fluid through the line 4 with a consequent reduction in pressure at the lubricator which will cause the pressure in the lubricant reservoir to force a quantity of lubricant back through passages 26, 18, 21, and 8 into the air line where it is mixed with the air flowing to the machine so as to lubricate the same in a well known manner. Also during operation, assuming that the tool to be lubricated is fitted with some form of reciprocating motor there will be fluctuations of pressure in the supply line which will cause alternate flow of pressure fluid into the reservoir and lubricant from the reservoir with a continuous automatic pumping action. It will be noted that when the reservoir is tilted to any position whatever the arms 16 and 24 will swing about their respective pivots under the action of gravity to a position where the end of passage 26 is disposed at the lowest point of the reservoir. With this construction even if the lubricator be turned upside down as it is liable to be in actual practice it will continue to function and draw oil from the reservoir until the supply is practically exhausted.

In the modified form of construction shown in Fig. 4 instead of providing two swinging members, one of which is pivoted upon the other I have provided a single swinging arm 34 projecting laterally and downwardly to a point adjacent the outermost corner of the reservoir. The arm 34 has a hub portion 35 mounted in the same manner as the hub 15 on member 16 in the preferred form which therefore will not be again described in detail. Also the outer end of the swinging arm 34 may be formed with a weighted portion 36 so as to insure that the arm will always swing about its bearing on the reduced portion 17 of the member 13 until the end of a passage 37, which extends longitudinally through the arm and communicates with groove 19, will be always at the lowest point in the reservoir. Aside from these features, the construction of this modified form is the same as that described in connection with the preferred embodiment. The mode of assembling and the operation will also be obvious from the above description, the only difference between the operation of the two forms being that in the modification, the device would not be operative to withdraw all of the oil from the reservoir if the lubricator should be turned completely upside down. However it will be apparent that for all ordinary conditions as long as the lubricator is kept on its bottom surface, all of the lubricant may be withdrawn even if the device be tilted to the extreme limit in any direction.

As a result of my invention it will be evident that an improved lubricator of simple construction has been devised which will automatically function to supply lubricant at the desired time into a pressure fluid supply line and that this lubricator, by reason of the arrangement of pivoted members, will permit substantially all of the lubricant being withdrawn from the reservoir, no matter what position the device may assume in actual use. At the same time it will be apparent that the construction is such as to enable the parts to be easily assembled and quickly accessible for examination and cleaning.

While I have in this application specifically described two embodiments which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In an automatic lubricator adapted to be installed in a pressure fluid supply line, a casing having means for conducting pressure fluid therethrough, said casing having an exterior flat bottom surface on which it is adapted to rest during use, a lubricant reservoir in said casing, and means for supplying lubricant from said reservoir to said conducting means including a lubricant conducting member pivotally supported wholly from the bottom wall of said casing and arranged to swing about an axis substantially perpendicular to said flat surface.

2. An automatic lubricator adapted to be installed in a pressure fluid supply line comprising a casing having a filler opening in the top wall thereof, a lubricant reservoir in said casing, said casing having a passage for conducting pressure fluid therethrough, means for supplying lubricant from said reservoir to said passage comprising a lubricant conducting member insertable through said filler opening, and means also insertable through said opening for securing said member to the lower wall of said casing for free pivotal movement.

3. In an automatic lubricator, a casing having means for conducting pressure fluid therethrough, a lubricant reservoir in said casing having a filler opening in the top wall thereof, means for supplying lubricant from said reservoir to said conducting means comprising a swinging fluid conducting member insertable through said opening, and a bearing member cooperating with said fluid conducting member insertable through said filler opening and having means for attachment to said casing so as to permit swinging movement of said fluid conducting member relative thereto.

4. In an automatic lubricator, a casing having a pressure fluid conducting passage therethrough, a lubricant reservoir in said casing, a boss projecting into said reservoir from the lower wall of said casing, a filler opening in the top wall of said reservoir alined with said boss, a bearing member attached to said boss, and a pressure fluid conducting member pivotally mounted on said bearing member and boss, said members being removable through said opening.

5. In an automatic lubricator, a casing having a pressure fluid conducting passage therethrough, a lubricant reservoir in said casing, a boss projecting into said reservoir from one wall of said casing, a filler opening in the opposite wall alined with said boss, a bearing member having means for attachment to said boss and a lubricant conducting means pivotally mounted on said bearing member and boss and having a passage therein in constant communication with said pressure fluid conducting passage, said movable means and bearing member being removable from said reservoir through said filler opening.

6. In an automatic lubricator, a casing having a fluid conducting passage therethrough, a lubricant reservoir in said casing, a boss projecting into said reservoir from the lower wall of said reservoir, an alined filler opening in the top wall thereof, said boss having a passage therethrough communicating with said fluid conducting passage, means for supplying lubricant from said casing to said fluid conducting passage comprising a bearing member attached to the boss having a passage communicating with the passage in said boss, a horizontal arm pivotally mounted on said bearing member for free swinging movement and having a passage therethrough in constant communication with the passage in said bearing member, and a swinging member pivotally mounted on said arm and having a passage therethrough in constant communication with said other passages.

7. In an automatic lubricator adapted to be installed in a pressure fluid supply line, a casing having a pressure fluid conducting passage therethrough, a lubricant reservoir in said casing, a boss projecting into said reservoir from one wall thereof, a combined bearing member and valve casing having means for attachment to said boss, and pressure fluid conducting means pivotally mounted on said bearing member, said means and said member having passages in constant communication with each other and in communication with said fluid conducting passage for supplying lubricant therethrough from the reservoir, and an adjustable valve mounted in said member for controlling said passages.

8. In an automatic lubricator adapted to be installed in a pressure fluid supply line, a casing having means for conducting pressure fluid therethrough, said casing having an exterior flat bottom surface on which it is adapted to rest during use, a lubricant reservoir in said casing, a boss rising from the bottom wall of said casing, and means for supplying lubricant from said reservoir to said conducting means including lubricant conducting means pivotally supported wholly from said boss to swing about an axis substantially perpendicular to said flat surface, the terminal end of said lubricant conducting means being arranged closely adjacent the bottom wall of said casing.

9. In an automatic lubricator adapted to be installed in a pressure fluid supply line, a casing having an exterior flat bottom surface on which it is adapted to rest during use, means integral with said casing providing a passage therethrough for conducting pressure fluid, a lubricant reservoir in said casing, and means for supplying lubricant from said reservoir to said passage including a lubricant conducting member pivotally supported wholly from the bottom wall of said casing and arranged to swing about an axis substantially perpendicular to said bottom surface.

10. In an automatic lubricator adapted to be installed in a pressure fluid supply line, a casing having an exterior flat bottom surface on which it is adapted to rest during use, means integral with said casing providing a passage therethrough for conducting pressure fluid, a lubricant reservoir in said casing, means for supplying lubricant from said reservoir to said passage including a lubricant conducting member pivotally supported wholly from the bottom wall of said casing and arranged to swing about an axis perpendicular to said bottom surface, and a valve for controlling flow of lubricant to said passage.

11. In an automatic lubricator, a casing having a pressure fluid conducting passage therethrough, a lubricant reservoir in said casing, a lubricant conducting member disposed within said reservoir, means for pivotally supporting said lubricant member in said chamber, and a filler opening in the wall of said reservoir and through which said lubricant member is insertable.

12. In an automatic lubricator, a casing having a pressure fluid conducting passage therethrough, a lubricant reservoir in said casing, a member disposed in said reservoir and having a passage for conducting lubricant to said pressure fluid conducting passage in the casing, means for movably supporting said lubricant conducting member in said reservoir, an adjustable valve for controlling the lubricant passage, an opening in the wall of said reservoir, and means for supporting said valve whereby it is accessible for adjustment at all times through said opening irrespective of the position of the lubricator.

In testimony whereof I affix my signature.

MERVIN C. HUFFMAN.